(12) United States Patent
Hulstein et al.

(10) Patent No.: US 9,265,198 B2
(45) Date of Patent: Feb. 23, 2016

(54) HARVESTER HEAD ASSEMBLY WITH APPARATUS FOR GUIDING HARVESTED CROPS

(71) Applicants: Nathan D. Hulstein, Litchfield, MN (US); Michael L. Banken, Litchfield, MN (US); Ian Kristoffer Shoultz, Atwater, MN (US)

(72) Inventors: Nathan D. Hulstein, Litchfield, MN (US); Michael L. Banken, Litchfield, MN (US); Ian Kristoffer Shoultz, Atwater, MN (US)

(73) Assignee: Dragotec USA, Inc., Fenton, IA (US)

( * ) Notice: Subject to any disclaimer, the term of this patent is extended or adjusted under 35 U.S.C. 154(b) by 0 days.

(21) Appl. No.: 14/077,876

(22) Filed: Nov. 12, 2013

(65) Prior Publication Data

US 2015/0128549 A1    May 14, 2015

(51) Int. Cl.
    A01D 45/02           (2006.01)
(52) U.S. Cl.
    CPC .................................. *A01D 45/021* (2013.01)
(58) Field of Classification Search
    CPC . A10D 45/021; A01D 45/023; A01D 45/025; A01D 41/142
    USPC .................................. 56/119, 94, 320.1, 319
    See application file for complete search history.

(56) References Cited

U.S. PATENT DOCUMENTS

| | | | | |
|---|---|---|---|---|
| 2,751,744 A * | 6/1956 | Reade et al. | | 56/119 |
| 3,646,737 A * | 3/1972 | Grant | | 56/106 |
| 3,785,130 A * | 1/1974 | Gaeddert | | 56/98 |
| 4,446,682 A * | 5/1984 | Jennen et al. | | 56/119 |
| 5,195,309 A * | 3/1993 | Mossman | | 56/119 |
| 5,330,114 A * | 7/1994 | Trenkamp et al. | | 241/101.77 |
| 5,444,968 A * | 8/1995 | Barton | | 56/119 |
| 5,761,893 A * | 6/1998 | Lofquist et al. | | 56/94 |
| 5,775,076 A * | 7/1998 | Mossman | | 56/119 |
| 5,787,697 A * | 8/1998 | Post | | 56/119 |
| 6,247,297 B1 * | 6/2001 | Becker | | 56/119 |
| 6,901,730 B1 * | 6/2005 | Buresch et al. | | 56/314 |
| 7,240,471 B2 * | 7/2007 | Mossman | | 56/119 |
| D697,944 S * | 1/2014 | Walker et al. | | D15/28 |
| 8,640,434 B2 * | 2/2014 | Lohrentz et al. | | 56/119 |
| 8,646,250 B2 * | 2/2014 | Lohrentz et al. | | 56/109 |
| 2007/0193242 A1 * | 8/2007 | Kost et al. | | 56/119 |
| 2009/0025354 A1 * | 1/2009 | Guldenpfennig et al. | | 56/119 |
| 2012/0042619 A1 * | 2/2012 | Lohrentz et al. | | 56/62 |
| 2012/0291410 A1 * | 11/2012 | Silver et al. | | 56/119 |

OTHER PUBLICATIONS

Drago TEC USA, Drago Series II Corn Head wit Kernel Capture Technology™, Nov. 2012, 12 pgs, published by Olimac.

* cited by examiner

*Primary Examiner* — Árpád Fábián-Kovács
(74) *Attorney, Agent, or Firm* — Merchant & Gould P.C.

(57) ABSTRACT

A combine harvester includes a harvester head assembly. The harvester head assembly includes an apparatus having a body. A forward end of the apparatus includes a barrier flange extending therefrom and forming a barrier surface that operates to block harvested crops from dropping off the forward end of the bonnet. Additionally, the barrier flange includes a kickback portion. The kickback portion operates to deflect harvested crops toward the rearward direction to further avoid loss of harvested crops out the forward end of the harvester head assembly.

20 Claims, 14 Drawing Sheets

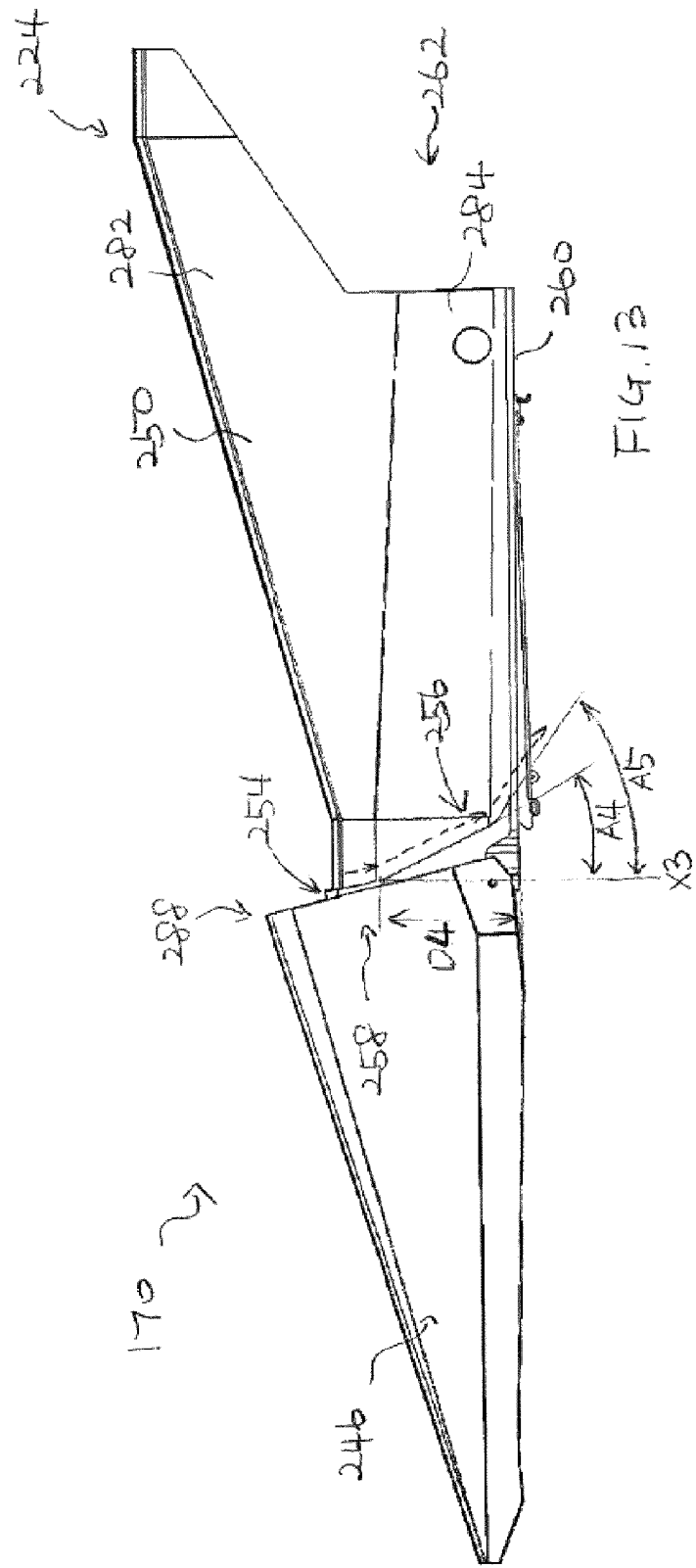

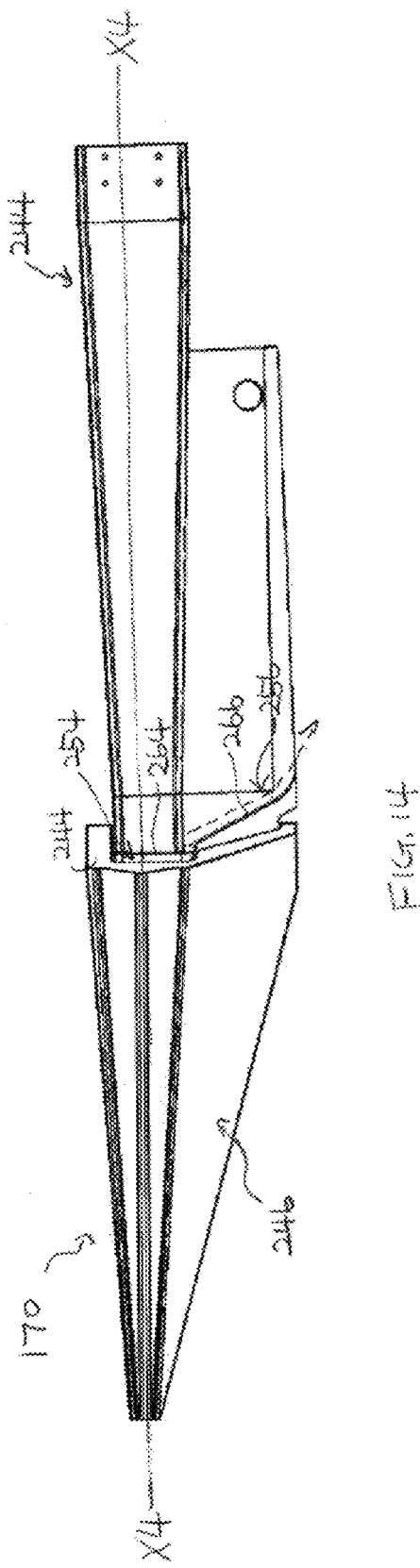

HARVESTER HEAD ASSEMBLY WITH APPARATUS FOR GUIDING HARVESTED CROPS

BACKGROUND

Combine harvesters are machines for harvesting grain crops. Combine harvesters typically operate to cut, thresh and clean standing crops of grain. Some combine harvesters are equipped with harvester head assemblies that are designed for particular crops. Such harvester head assemblies for combine harvesters operate to take up stalks of grain crops and run them through a series of processors.

SUMMARY

In general terms, this disclosure relates to a combine harvester. In one possible configuration and by non-limiting example, the combine harvester includes a harvester head assembly. Various aspects are described in this disclosure, which include, but are not limited to, the following aspects.

One aspect is an apparatus for guiding harvested crops in a harvester head assembly of a combine harvester, wherein when in operation, the combine harvester and the harvester head assembly are driven in an advance direction, the apparatus comprising: a body having a forward end and a rearward end; and a barrier flange extending from the forward end of the body, the barrier flange comprising: a barrier surface facing a direction opposite to the advance direction; and a kickback portion configured to deflect a flow of harvested crops in the direction opposite to the advance direction.

Another aspect is a combine harvester comprising a harvester head assembly, wherein when in operation, the combine harvester and the harvester head assembly are driven in an advance direction, the harvester head assembly having at least one row unit divider assembly, the row unit divider assembly comprising: a bonnet comprising: a body having a forward end and a rearward end; and a barrier flange extending from the forward end of the body; a snout having a forward end and a rearward end, the rearward end of the snout connected to the forward end of the body of the bonnet; and a barrier having a blocking surface, the blocking surface configured to direct a flow of harvested crops in a direction opposite to the advance direction.

A further aspect is a combine harvester comprising a harvester head assembly, wherein when in operation, the combine harvester and the harvester head assembly are driven in an advance direction, the harvester head assembly having at least one row unit divider assembly, the row unit divider assembly comprising: a bonnet comprising: a body having a forward end and a rearward end; and a barrier flange extending from the forward end of the body; a snout having a forward end and a rearward end, the rearward end of the snout connected to the forward end of the body of the bonnet; and a barrier having a blocking surface, the blocking surface configured to direct a flow of harvested crops in a direction opposite to the advance direction.

BRIEF DESCRIPTION OF THE DRAWINGS

FIG. 13 is a side elevation view of the fender assembly of FIG. 11.

FIG. 14 is a top elevation view of the fender assembly of FIG. 11.

DETAILED DESCRIPTION

Figure 1:
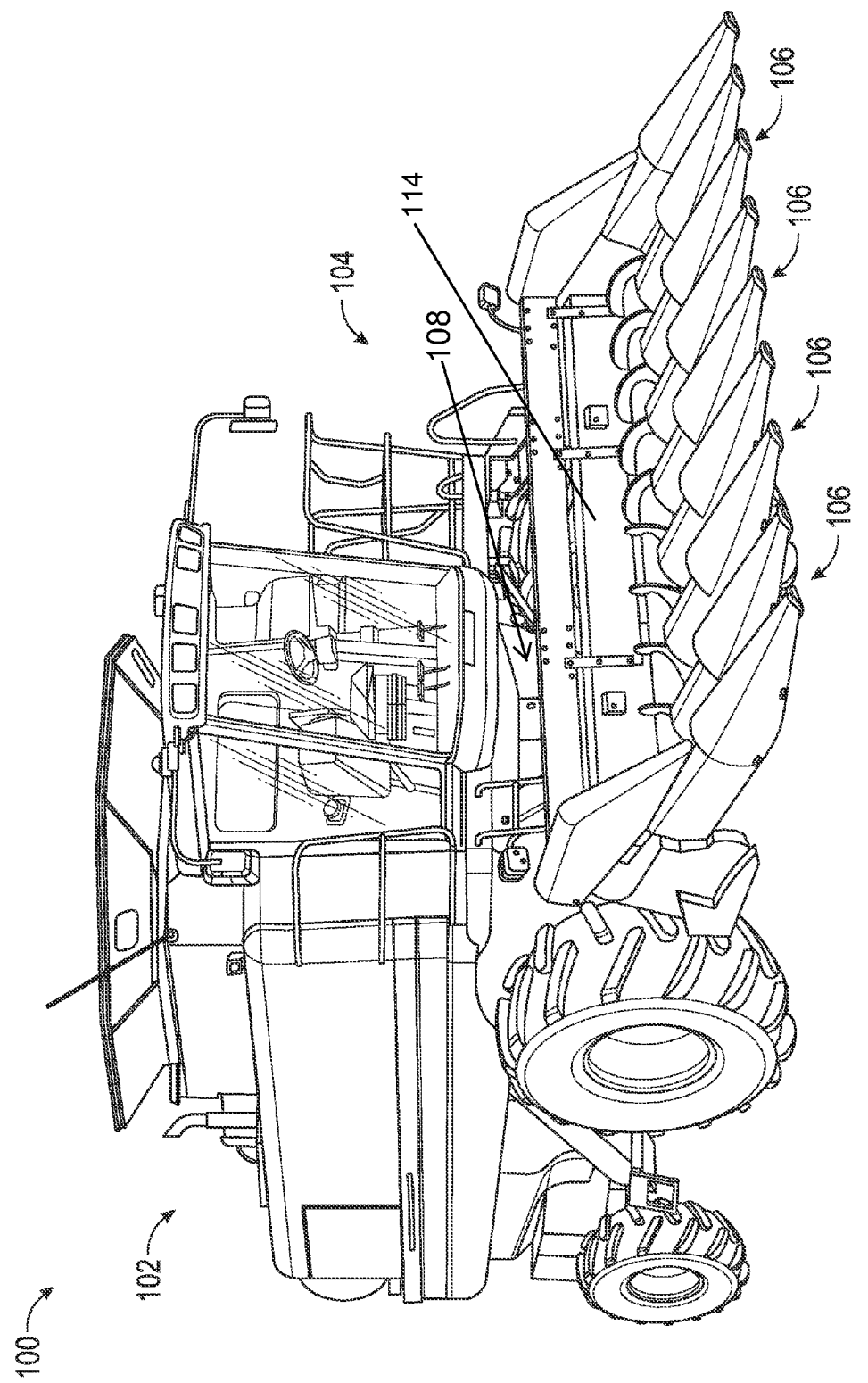
FIG. 1 is a perspective view of an example combine harvester according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a perspective view of an example combine harvester 100. In this example, the combine harvester 100 includes a combine machine 102, a head assembly 104 and a feeder house 108. The head assembly 104 includes multiple row unit divider assemblies 106.

In this example, the combine harvester 100 operates to harvest corn. However, the combine harvester 100 of the present disclosure is not limited to a corn harvester, and other embodiments are configured to harvest other crops, such as other grain crops. In some embodiments, the harvester is a combine, which performs harvesting operations including reaping, threshing, and winnowing.

The combine harvester 100 includes a combine machine 102. The combine machine 102 is typically a self-propelled vehicle, including wheels and an engine that drives the wheels. The combine harvester 100 typically includes a cab where an operator interacts with various controls to operate and control the harvester 100. The combine harvester 100 also includes the feeder house 108 at a forward end of the combine harvester 100. The feeder house 108 provides a channel through which crops harvested at the head assembly 104 pass into the combine harvester 100.

The head assembly 104 is connected to and extends from the forward end of the combine harvester 100. As the combine harvester 100 advances forward through rows of corn stalks, the head assembly 104 operates to separate corn ears including the corn kernels (hereinafter, "corn ears" include the corn kernels) from the stalks and collect them.

The separated corn ears are then fed into the combine machine 102 through the feeder house 108. In the combine machine 102, kernels are separated from the corn ears and material other than grain (M.O.G.). The grain is then stored in a storage bin within the combine machine 102, and can be subsequently transferred to another vehicle or storage area, as desired.

In some embodiments, the head assembly 104 includes a plurality of row unit dividers assemblies 106. The row unit divider assemblies 106 are sized and configured to gather corn from respective rows of corn stalks. For example, corn is often grown along rows, which are separate from each other with uniform row spacing. Row spacing can be from about 15 inches to about 38 inches, for example. The row unit divider assemblies 106 are spaced from each other at about the same spacing.

When the combine harvester 100 is operating, the row unit divider assemblies 106 are positioned between the rows. As the row unit divider assemblies 106 are advanced through the corn crop by the combine harvester 100, the row unit divider assemblies 106 guide and support the corn stalks as they enter the combine machine 102.

Figure 2:
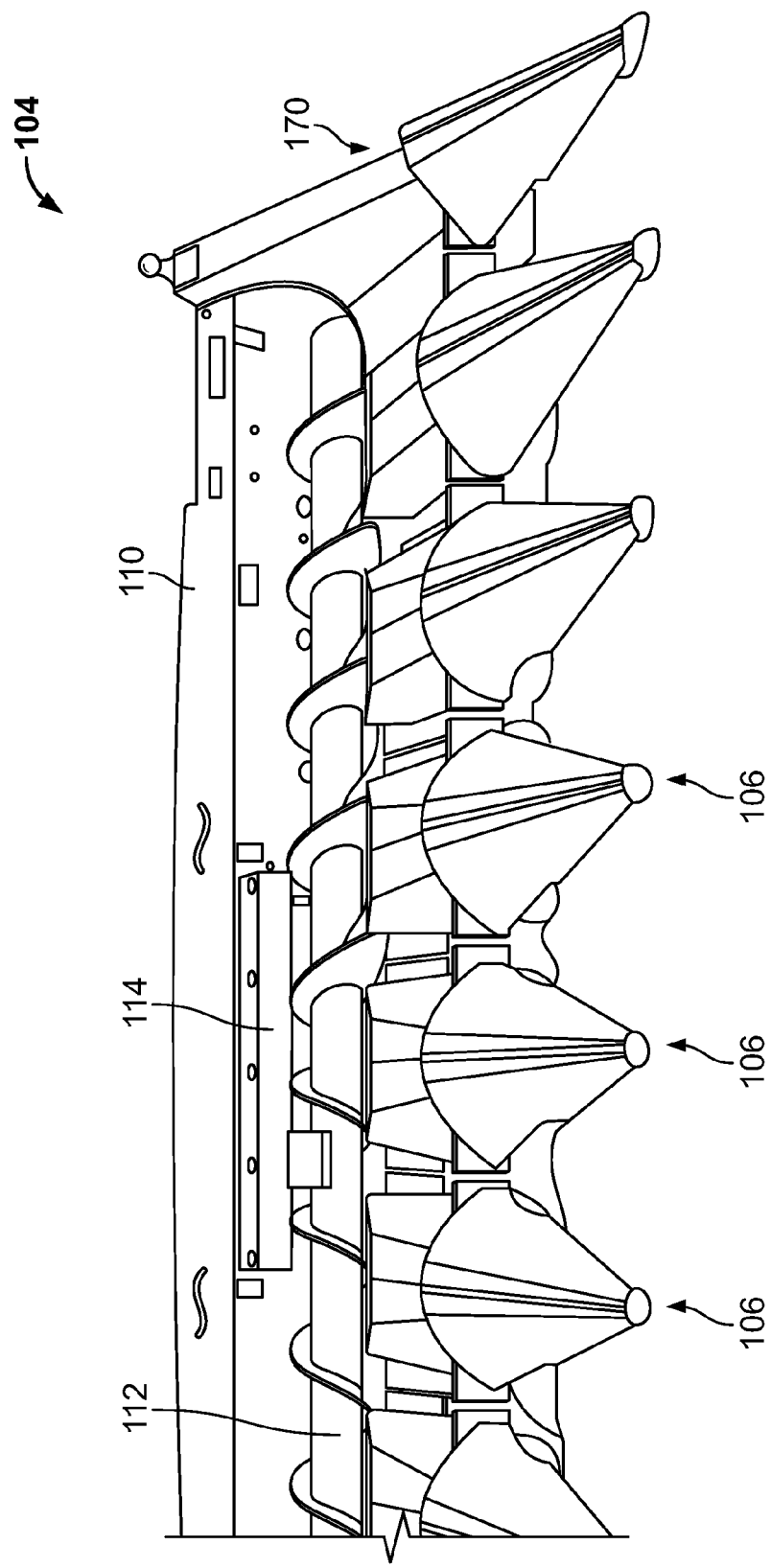
FIG. 2 is a front perspective view of an example of a head assembly having a plurality of row unit divider assemblies according to the present disclosure.

FIG. 2 is a front perspective view of an example of a head assembly 104 having a plurality of row unit divider assemblies 106. In this example, the head assembly 104 further includes a push face 110 and an auger 112. In other embodiments, the head assembly 104 includes fender assemblies 170.

The push face 110 operates to accommodate the plurality of row unit divider assemblies 106 and the auger 112 and deliver corn ears collected by the row unit divider assemblies 106 and the auger 112 to the combine harvester 100 through the feeder house 108. The push face 110 is connected to the forward end of the combine harvester 100. In this example, the push face 110 also has an opening 114 that is connected to the feeder house 108.

The auger 112 operates to convey corn ears, which have been gathered by the row unit divider assemblies 106, into the opening 114 of the push face 110 and then to the feeder house 108. In this example, the auger 112 is arranged between the push face 110 and the plurality of row unit divider assemblies 106. In some embodiments, the auger 112 is located across the push face 110 behind the rear end of the plurality of row unit divider assemblies 106. In some embodiments, the auger 112 has helical blades around the surface of the auger 112 so that it operates as a screw conveyer. In other embodiments, the helical blades are symmetric (formed in opposite winding directions) about the opening 114 for the feeder house 108.

As the combine harvester 100 is driven forward through rows of corn stalks, the plurality of row unit divider assemblies 106 operate to separate corn ears from the stalks and pull the corn ears into the auger 112. As a result, the separated corn ears are collected on or around the auger 112. Then, in this example, the auger 112 conveys the separated corn ears across the push face 110 into the feeder house 108 though the opening 114 formed in the push face 110. The separated corn ears around the auger 112 are guided by the helical blades, which are operated by rotating of the auger 112.

The fender assembly 170 operates not only as a side wall of the head assembly 104, but also as a set of a bonnet, a snout and a barrier of the row unit divider assembly 106 as explained in detail below. In some embodiment, a pair of the fender assembly 170 is arranged on a gathering mechanism 122 of the row unit divider assembly 106 at each of the farthest side ends of the head assembly 104, respectively.

Figure 3:
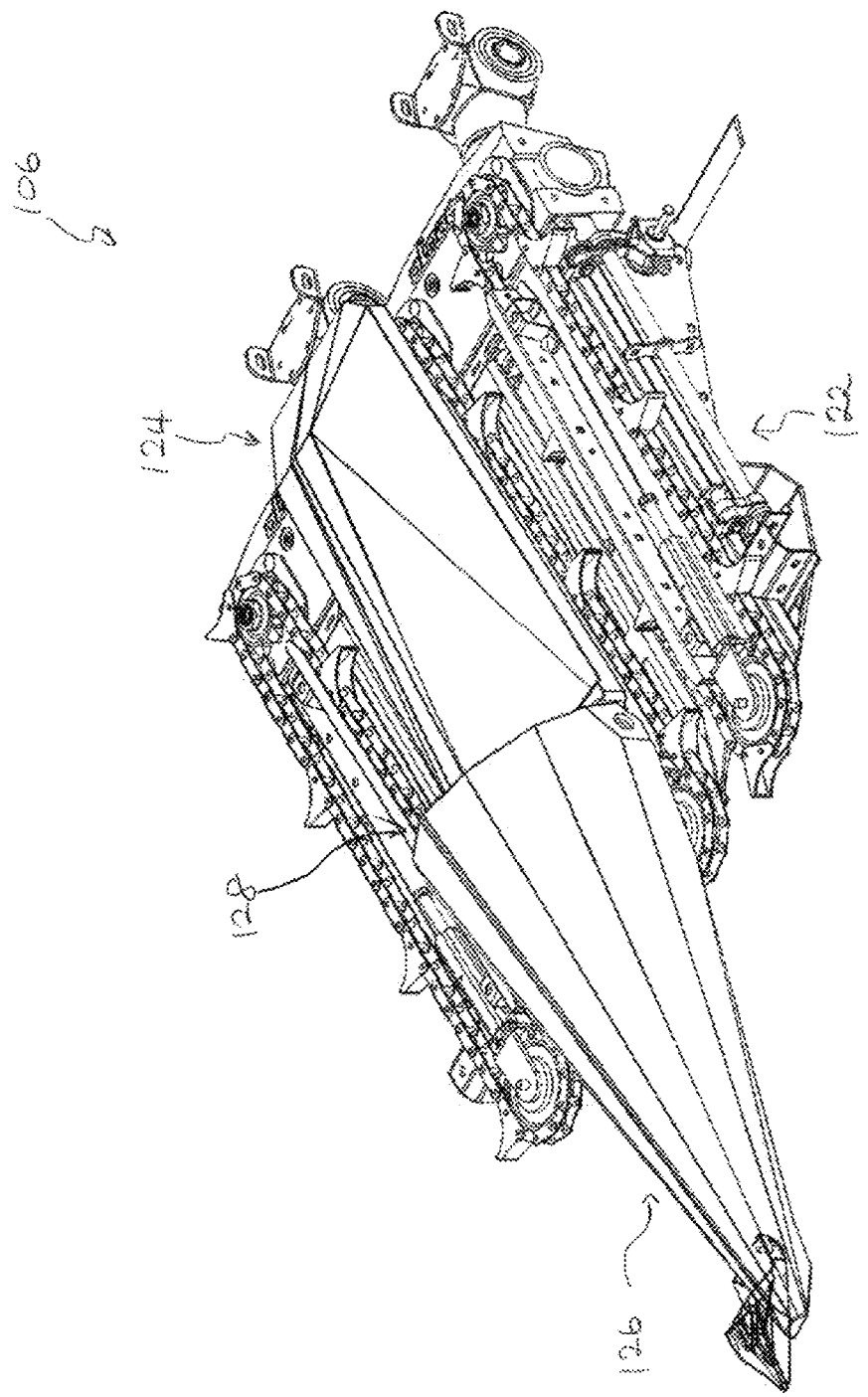
FIG. 3 is a side perspective view of an example of a row unit divider assembly according to the present disclosure.

FIG. 3 is a side perspective view of an example of a row unit divider assembly 106. In this example, the row unit divider assembly 106 includes a gathering mechanism 122, a bonnet 124, a snout 126 and a barrier 128.

The gathering mechanism 122 operates to separate ears of corn from stalks and deliver the harvested corn ears to the auger 112. The gathering mechanism 122 is explained in detail below with reference to FIG. 4.

The bonnet 124 operates to permit corn ears that have been separate from stalks to gather onto the gathering mechanism 122 so that the corn ears are delivered to the auger 112 and then collected to the feeder house 108. In this example, the bonnet 124 is configured and arranged to cover at least a portion of the gathering mechanism 122.

The snout 126 operates to slide into, and pass between, adjacent rows of corn stalks as the combine harvester 100 advances forward, so that the snout 126 guides the rows of corn stalks into the gathering mechanism 122. In some embodiments, the snout 126 is also configured to pick up off the ground any corn stalks that have fallen over or lain flat due to natural disaster such as hail damage, and, therefore, helps the corn stalks being fed into the gathering mechanism 122.

The barrier 128 operates to ensure the corn ears, which have been separated from the stalks, to stay on, or fall onto, the gathering mechanism 122. In this example, the barrier 128 is formed between the bonnet 124 and the snout 126.

Figure 4:
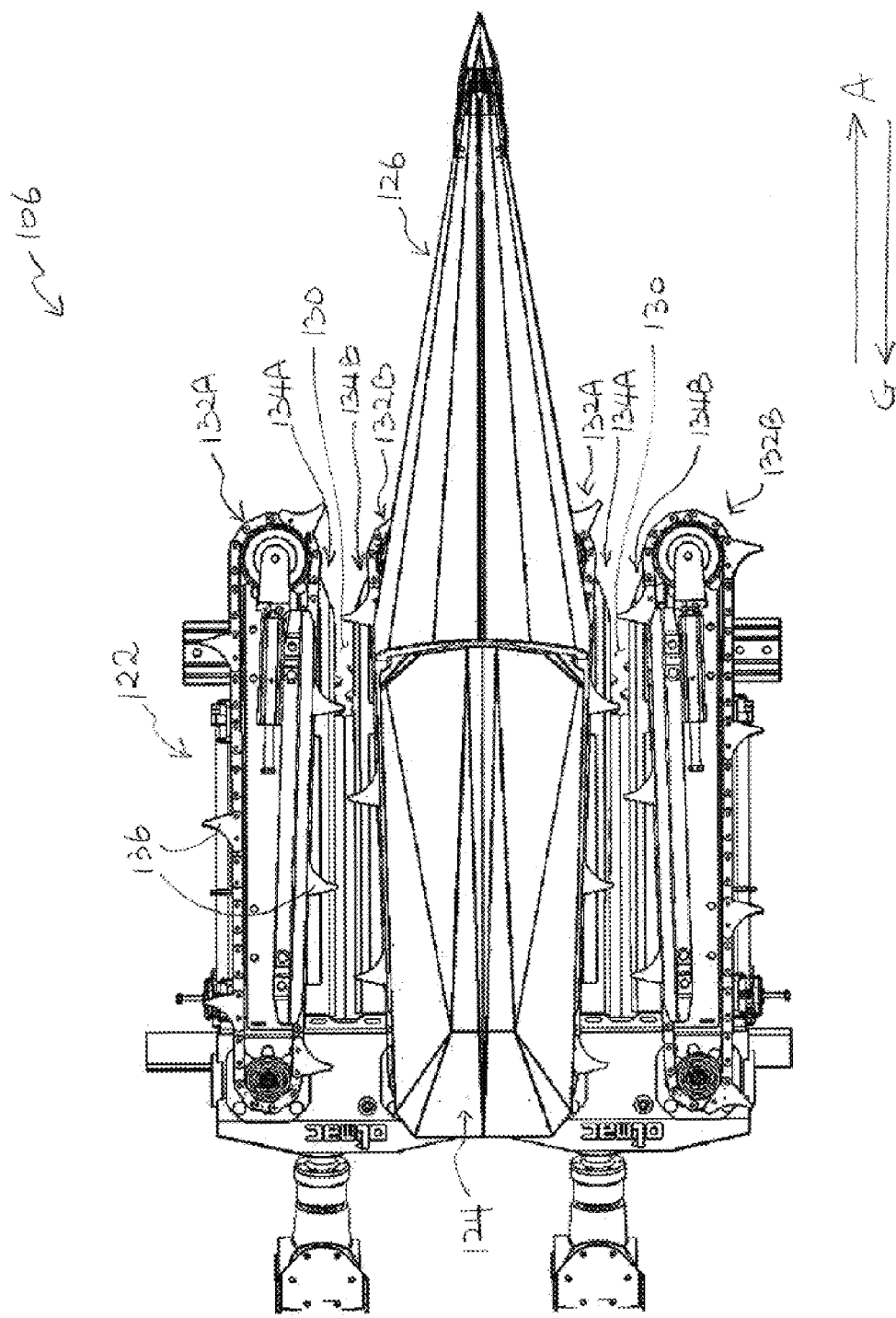
FIG. 4 is a top view of the row unit divider assembly of FIG. 3.

FIG. 4 is a top view of the row unit divider assembly 106 of FIG. 3. In this example, the gathering mechanism 122 includes a gathering channel 130, a pair of gathering chain systems 132A and 132B, and a pair of deck plates 134A and 134B. For the purpose of clarity, a direction in which the combine harvester 100 advances is referred to as a forward direction or an advance direction A, which is from the left side to the right side in FIG. 4. A backward direction or a gathering direction G is defined as a direction opposite to the advance or forward direction A, in which corn stalks are fed into the gathering mechanism 122 or in which corn ears are delivered along the gathering mechanism 122 to the auger 112.

In this example, the gathering mechanism 122 has a harvesting end and a collecting end. As the combine harvester 100 advances in the forward direction A, corn stalks are fed into the gathering mechanism 122 at the harvesting end, which is the right end of the gathering mechanism 122 in FIG. 4. The gathering mechanism 122 then operates to harvest corn ears from the corn stalks at the harvesting end. The harvested corn ears are delivered or guided from the harvesting end to the collecting end of the gathering mechanism 122. The collecting end of the combine harvester 100 is arranged adjacent the auger 112 so that the corn ears delivered to the collecting end of the gathering mechanism 122 are pulled into the auger 112.

The gathering channel 130 extends between the harvesting end and the collecting end of the gathering mechanism 122 and provides a channel along which the corn ears harvested at the harvesting end of the gathering mechanism 122 are guided and delivered to the collecting end of the gathering mechanism 122 and to the auger 112.

The pair of gathering chain systems 132A and 132B operates to pull the harvested corn ears in the backward direction G to the auger 112 along the gathering channel 130. In this example, the gathering chain systems 132A and 132B are configured to rotate between the harvesting end and the collecting end of the gathering mechanism 122. The adjacent gathering chain systems 132A and 132B are arranged in opposite sides with the gathering channel 130 therebetween. The adjacent gathering chain systems 132A and 132B rotate in opposite directions so that each of the gathering chain systems 132A and 132B moves from the harvesting end to the collecting end along the gathering channel 130. In some embodiments, the gathering chain systems 132A and 132B are made with conveyer chain links.

In some embodiments, the gathering chain systems 132A and 132B include a plurality of projections 136. The projections 136 are configured to grab corn ears onto the gathering mechanism 122 and pull the corn ears in the gathering direction G. In some embodiments, the projections 136 protrude over the gathering channel 130 from the chain links. In other embodiments, the projections 136 of one gathering chain system 132A are arranged to alternate with the projections 136 of the other gathering chain system 132B so that the projections 136 of the gathering chain systems 132A and 132B grab the corn ears more effectively at the harvesting end while the projections 136 do not interfere with each other between the pair of the gathering chain systems 132A and 132B.

The pair of deck plates 134A and 134B operates to separate corn ears from stalks at the harvesting end of the gathering mechanism 122. In some embodiments, the pair of deck plates 134A and 134B is also configured to make corn stalks straight up at the harvesting end so that corn ears are effectively pulled out from the stalks as the combine harvester 100 advances in the advance direction A.

In this example, the adjacent deck plates 134A and 134B is arranged under the gathering chain systems 132A and 132B, respectively, and in opposite sides with the gathering channel 130 therebetween. As a corn stalk enters the gathering channel 130, it first contacts the forward ends of the deck plates 134A and 134B. In some embodiments, the forward ends of the deck plates 134A and 134B have curved edges so that the entering stalk is smoothly fed into the gathering channel 130 between the pair of gathering chain systems 132A and 132B.

In other embodiments, the space between the deck plates 134A and 134B is adjustable depending on the thickness, or the diameter, of corn stalks passing along the gathering channel 130. In still other embodiments, the space between the deck plates 134A and 134B is adjusted by spring force to meet the thickness of the passing corn stalk while the deck plates 134A and 134B exert compression on the corn stalk from each side.

In some embodiments, the deck plates 134A and 134B include snapping rolls at their forward ends. The snapping rolls operate to pull down the entering stalks so that they become straight up while corn ears are separated from the stalks at the forward ends of the deck plates 134A and 134B (or at the harvesting end of the gathering mechanism 122) as the combine harvester 100 advances in the forward direction A.

In other embodiments, the deck plates 134A and 134B further include knife rollers at the harvesting end so that the entering stalks are cut off as their corn ears are harvested at the harvesting end.

Figure 5:
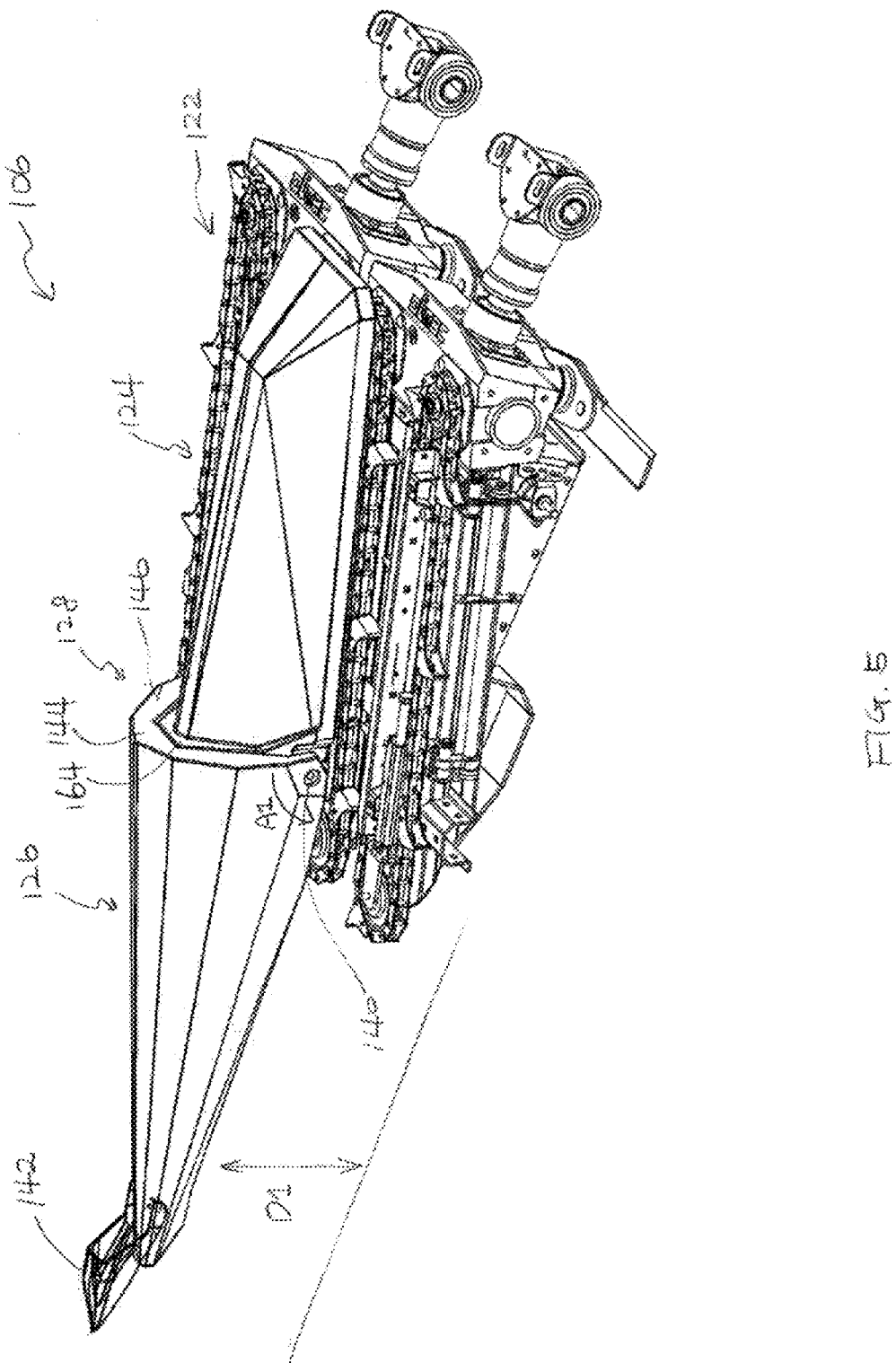
FIG. 5 is a side perspective view of the row unit divider assembly of FIG. 3.

FIG. 5 is a side perspective view of the row unit divider assembly 106 of FIG. 3. In this example, the row unit divider assembly 106 further includes the bonnet 124, the snout 126 and the barrier 128.

The bonnet 124 operates to cause corn ears harvested from stalks to slide on the surface of the bonnet 124 and then gather onto the gathering channel 130 of the gathering mechanism 122. The corn ears that gather onto the gathering channel 130 are conveyed by the gathering chain systems 132A and 132B into the auger 112. As shown in FIG. 4, the bonnet 124 is arranged on the gathering mechanism 122 so as to cover at least a portion of the gathering mechanism 122 between two adjacent gathering channels 130. In some embodiments, the longitudinal edge of the bottom of the bonnet 124 covers the gathering chain systems 132A and 132B while the projections 136 extend over the bonnet 124 toward the gathering channel 130. In other embodiments, the bonnet 124 is aligned with the gathering channel 130 in such a way that the longitudinal body of the bonnet 124 is arranged substantially in parallel with the gathering direction G. This configuration allows the harvested corn ears that have dropped on the surface of the bonnet 124 to slide down along the surface of the bonnet 124 and fall into the gathering channel 130 above the deck plates 134A and 134B.

The snout 126 operates to slide into a space between adjacent rows of corn stalks as the combine harvester 100 advances in the forward direction A. The snout 126 is configured to guide corn stalks into the gathering channel 130 of the gathering mechanism 122. In some embodiments, the snout 126 is an elongate structure that is connected to and extends from a forward end of the bonnet 124. In other embodiments, the snout 126 has a forward end and a rearward end and is configured to have a smaller cross-section toward the forward end than toward the rearward end. For example, the snout 126 can have a cone shape or a part thereof. In other embodiments, the snout 126 is formed as a pyramid having multiple triangular sides or as part of such a pyramid shape. The forward end of the snout 126 having a smaller cross-section toward the forward end than toward the rearward end can increase a chance of the snout 126 guiding rows of corn stalks into the gathering channel 130 or picking up off the ground any corn stalks that have fallen over or lain flat.

The snout 126 is connected to the forward end of the bonnet 124 at the rearward end of the snout 126. In some embodiments, the snout 126 is connected to the bonnet 124 at a snout pivot 140. The snout pivot 140 permits the snout 126 to pivot with respect to the bonnet 124 around the snout pivot 140, such as in the direction A1 or in the opposite direction. The snout pivot 140 permits the height (D1) of the snout 126 to be adjusted with respect to the ground GR, without adjusting the position of the bonnet 124. The snout pivot 140 also permits the snout 126 to pivot when the forward end of the snout 126 comes in contact with the ground GR or other objects such as rows of corn stalks, thereby reducing the chance of breaking the snout 126 or the row unit divider assembly 106. In other embodiments, the snout pivot 140 allows the row unit divider assembly 106 to be placed in a folded configuration (not shown) for more compact transportation and storage.

In some embodiments, the snout 126 has a tip portion 142 at the forward end of the snout 126. The tip portion 142 of the snout 126 provides a wear point that is stronger and more durable for longer life of the snout 126. The tip portion 142 also can provide a sharper tip of the forward end of the snout 126 so that the snout 126 slides along rows of corn stalks and picks up the corn stalks in more effective manners. In other embodiments, the tip portion 142 is replaceable so that it can be changed once sufficiently worn out.

In this example, the rearward end of the snout 126 has a rear end surface 144. The rear end surface 144 has a larger cross-section than the forward end of the bonnet 124. Therefore, when the snout 126 is connected to the bonnet 124, as shown in FIG. 5, the rearward end of the snout 126 overarches the forward end of the bonnet 124, thereby forming part of the barrier 128. In some embodiments, the rearward end of the snout 126 is configured to match up with the contour of the forward end of the bonnet 124.

In some embodiments, the snout 126 is formed of a sturdy material such as metal or plastic. In other embodiments, the snout 126 is formed of polyethylene, for example.

The barrier 128 operates to ensure the corn ears, which have been separated from the stalks, to stay on the bonnet 124 and fall onto the gathering channel 130 between the gathering chain systems 132A and 132B above the deck plates 134A and 134B. The barrier 128 is configured to prevent the harvested corn ears from falling forward (against the gathering direction G) and falling off the forward end of the gathering mechanism 122. Instead, the barrier 128 operates to direct the corn ears to slide or fall in the gathering direction G so that they slide down along the surface of the bonnet 124 and fall onto on the gathering channel 130 above the deck plates 134A and 134B, and then are grabbed by the projections 136 between the gathering chain systems 132A and 132B and conveyed to the auger 112.

In this example, the barrier 128 is configured to form a blocking surface 146 facing in the gathering or backward direction G. The blocking surface 146 extends radially in a transverse direction with respect to the gathering direction G. The blocking surface 146 operates to keep the harvested corn ears slipping down to the gathering channel 130 above the deck plates 134A and 134B. In some embodiments, the blocking surface 146 includes the rear end surface 144 of the snout 126 and a barrier surface 164 of the bonnet 124.

In some embodiments, the barrier 128 is arranged adjacent the harvesting end of the gathering mechanism 122. In other embodiments, the barrier 128 is arranged next to a location behind the forward ends of the deck plates 134A and 134B in the gathering direction G. Such a location is preferably a location where corn ears are actually separated from corn stalks between the deck plates 134A and 134B. In still other embodiments, the barrier 128 is arranged at any location where corn ears would likely fall off the gathering mechanism 122 as the corn ears are separated from the stalks entering into the gathering channel 130 while the combine harvester 100 advances in the forward direction A.

Figure 6:
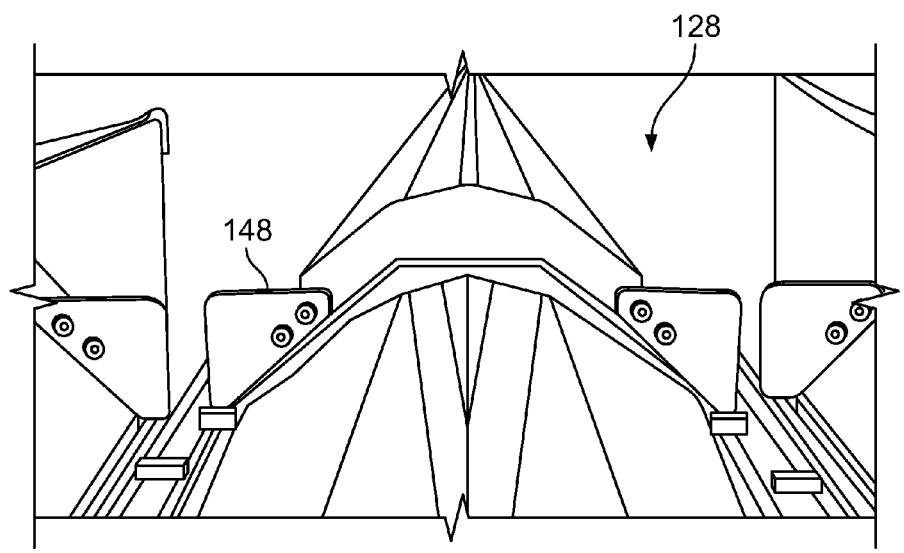
FIG. 6 is a perspective view of another example of the barrier according to the present disclosure.

FIG. 6 is a perspective view of another example of the barrier 128. In this example, the barrier 128 further includes guard plates 148. As the blocking surface 146 of the barrier 128, the guard plates 148 operates to prevent the harvested corn ears from falling off the forward end of the gathering mechanism 122 and ensure the corn ears to be confined in the gathering channel 130 between the gathering chain systems 132A and 132B above the deck plates 134A and 134B.

In this example, the guard plates 148 are attached on the blocking surface 146 so as to extend over the gathering channel 130. In some embodiments, the guard plates 148 are configured to at least partially interfere with the entrance of the gathering channel 130. The guard plates 148 operates to allow rows of corn stalks to enter into the gathering channel 130 over the guard plates 148 in the gathering or backward direction G, but does not permit the harvested corn ears to bounce back over the guard plates 148 in the advance or forward direction A. In some embodiments, the guard plates 148 are made of flexible materials for this configuration.

Figure 7:
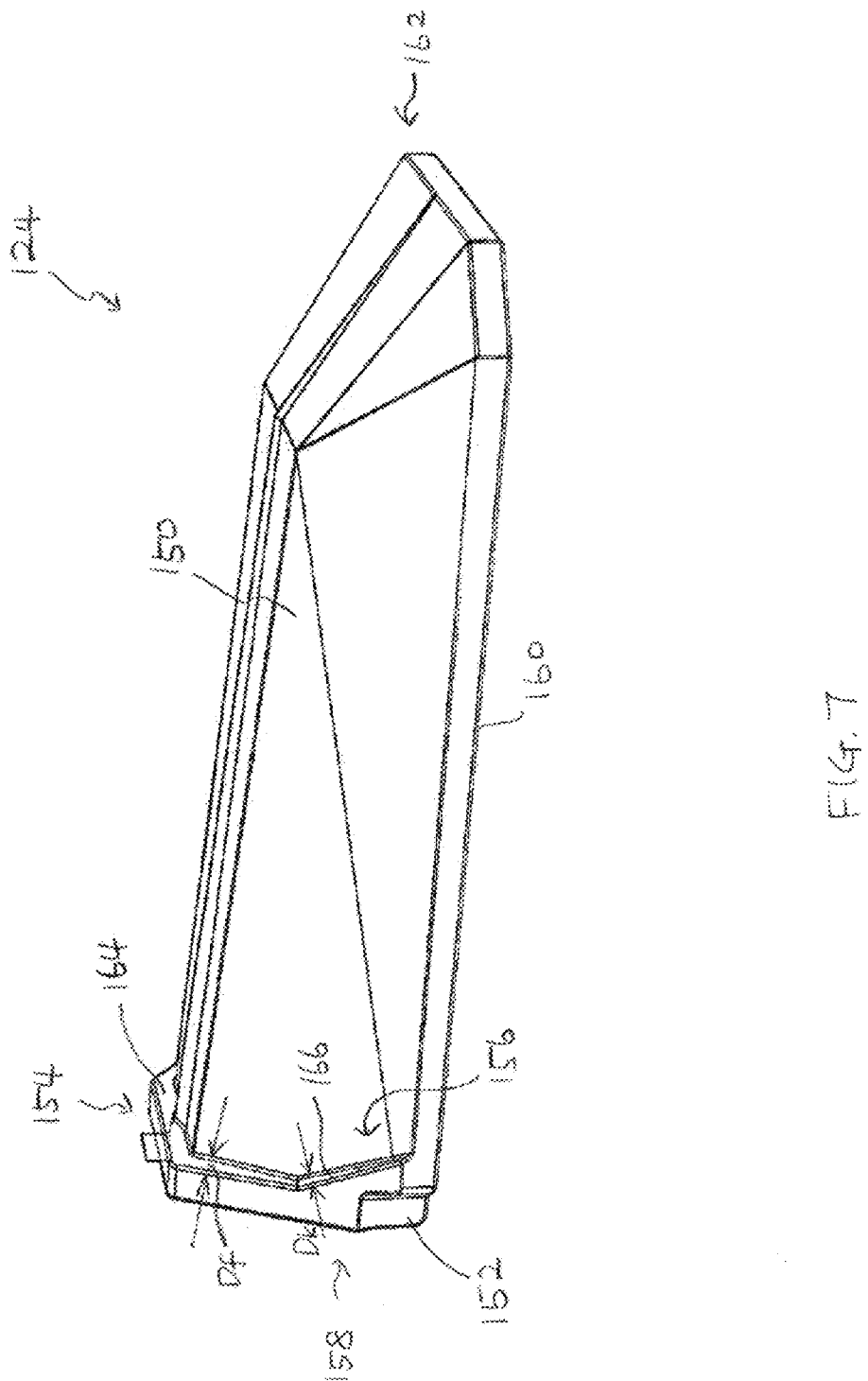
FIG. 7 is a side perspective view of an example of the bonnet according to the present disclosure.
Figure 8:
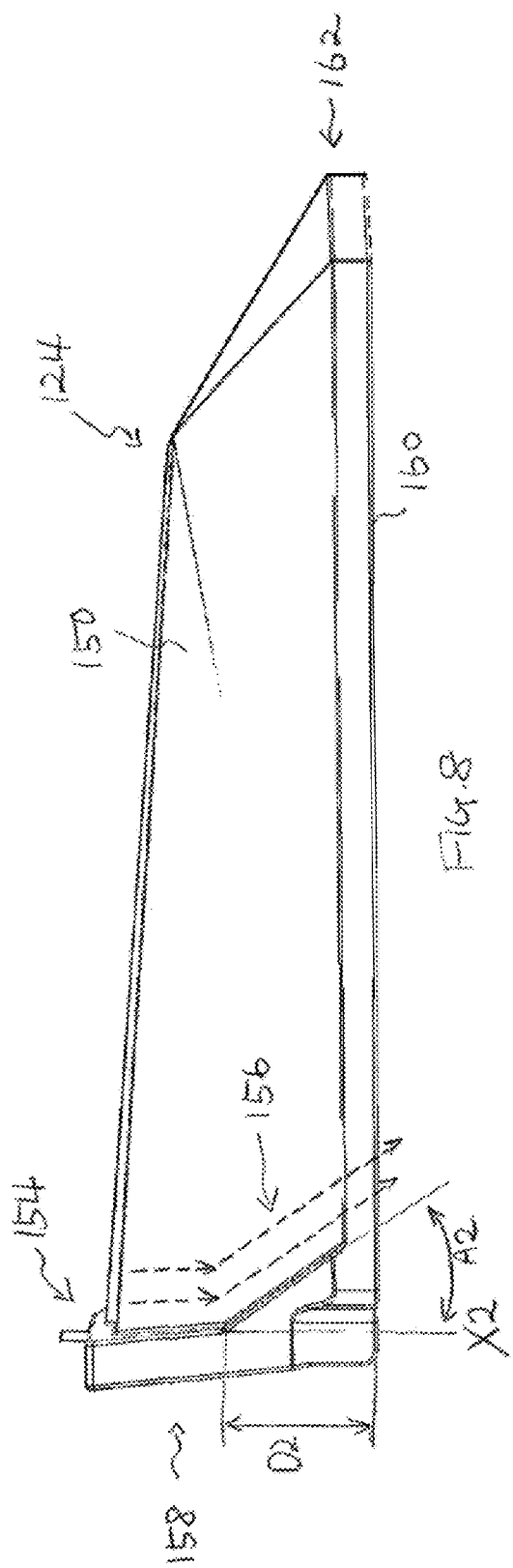
FIG. 8 is a side elevation view of the bonnet of FIG. 7.
Figure 9:
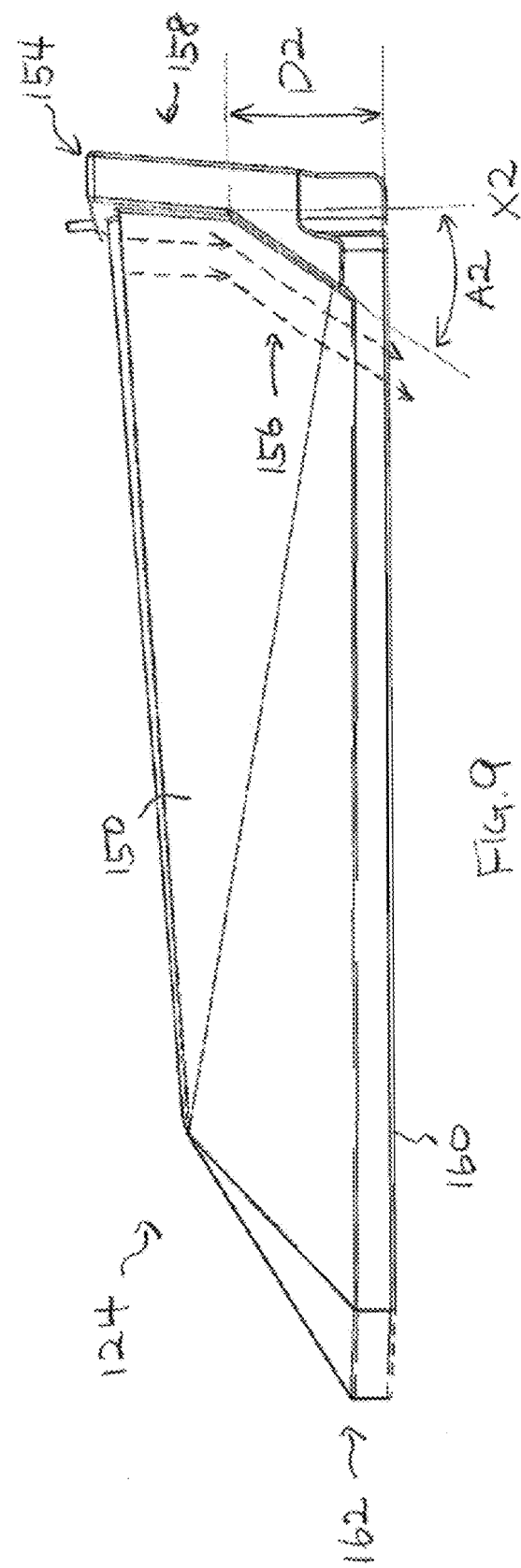
FIG. 9 is another side elevation view of the bonnet of FIG. 7.
Figure 10:
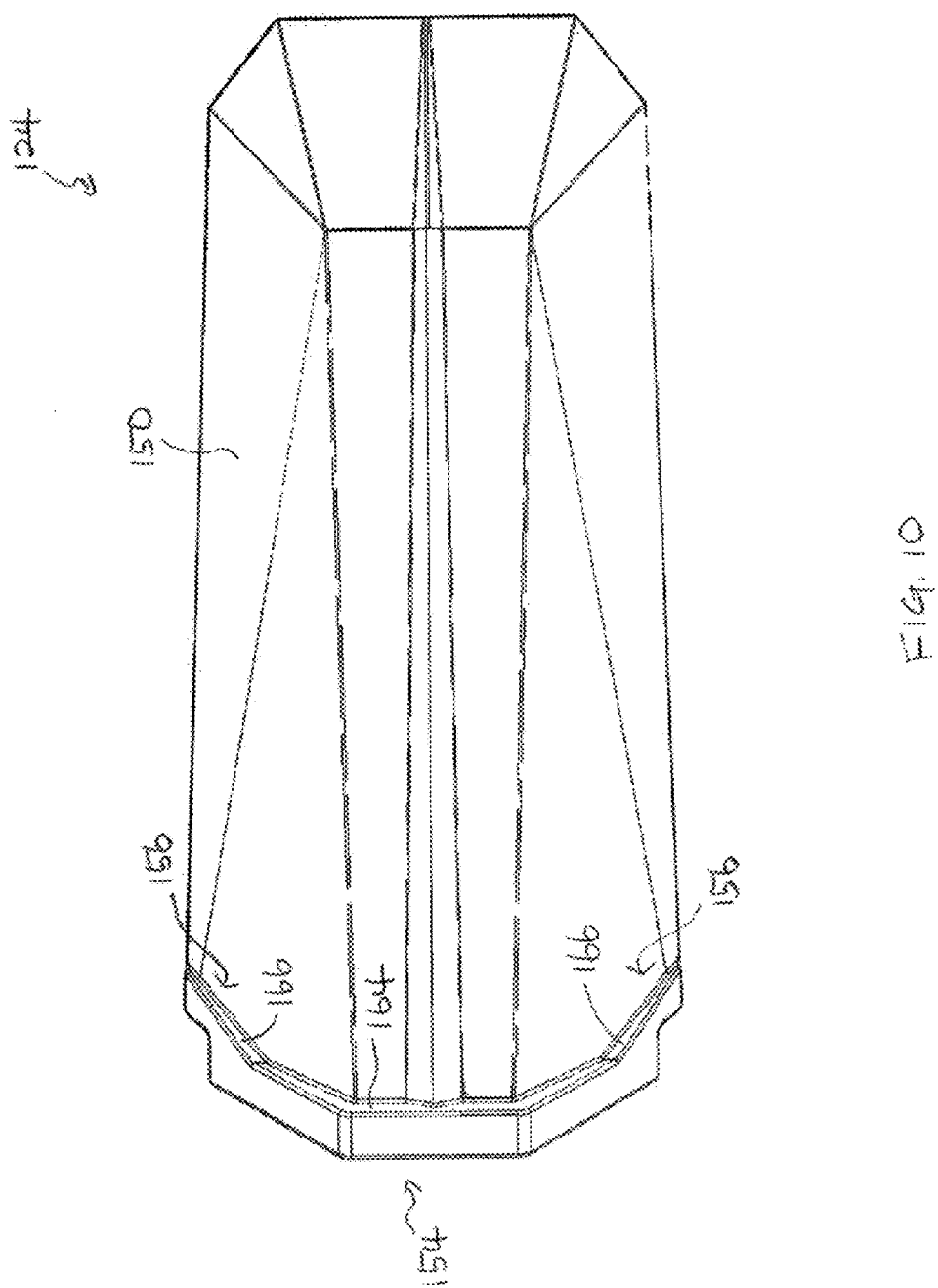
FIG. 10 is a top elevation view of the bonnet of FIG. 7.

FIGS. 7-10 illustrate an example of a bonnet 124. FIG. 7 is a side perspective view of an example of the bonnet 124. FIGS. 8 and 9 are side elevation views of the bonnet 124 of FIG. 7. FIG. 10 is a top elevation view of the bonnet 124 of FIG. 7.

In this example, the bonnet 124 includes a body 150, a pivot recess 152, a barrier flange 154 and a kickback portion 156. In some embodiments, the bonnet 124 is formed of a sturdy material such as metal or plastic. In other embodiments, the bonnet 124 is formed of polyethylene, for example.

The body 150 of the bonnet 124 is arranged on the gathering mechanism 122 in the gathering direction G so that the body 150 covers the gathering chain systems 132A and 132B while the body 150 is located between two adjacent gathering channels 130.

In some embodiments, the body 150 of the bonnet 124 is an elongate structure having a forward end 158, a longitudinal edge 160 and a rearward end 162.

The forward end 158 of the body 150 is arranged at the harvesting end of the gathering mechanism 122 and is coupled to the rearward end of the snout 126.

The rearward end 162 of the body 150 is arranged at the collecting end of the gathering mechanism 122 and positioned adjacent the auger 112. In some embodiments, the rearward end 162 is pivotally connected at the collecting end of the gathering mechanism 122 so that the body 150 can be lifted up from the gathering mechanism 122 at the hinge for servicing of the gathering mechanism 122.

In some embodiments, the longitudinal edge 160 of the bonnet 124 is located adjacent to the gathering channel 130 in parallel with the gathering channel 130 while the body 150 of the bonnet 124 covers the gathering chain systems 132A and 132B with the longitudinal edges 160 of the bonnet 124.

The body 150 of the bonnet 124 is configured to allow the harvested corn ears to fall on, and slide down along, the surface of the body 150 so that the corn ears fall into the gathering channel 130 above the deck plates 134A and 134B. In some embodiments, the body 150 has a tapered shape that is smaller toward the rearward end 162 and larger toward the forward end 158. Such a tapered shape of the body 150 having a downward slope as a whole in the gathering direction G increases the chance of the corn ears falling down to the gathering mechanism 122 and the auger 112 at the collecting end. In some embodiments, the body 150 has multiple sides to form such a substantially downward slope on the body 150 in the gathering direction G. In other embodiments, the body 150 has a rounded or dome shape.

The pivot recess 152 is used to connect the bonnet 124 to the snout 126. In this example, the forward end 158 of the bonnet 124 is connected to the rearward end of the snout 126 at the pivot recess 152. The pivot recess 152 is matched up with, and coupled to, the snout pivot 140 of the snout 126. The coupling with the pivot recess 152 of the bonnet 124 and the snout pivot 140 of the snout 126 permits the snout 126 to pivot with respect to the bonnet 124 around the snout pivot 140 or the pivot recess 152.

The barrier flange 154 operates to prevent the harvested corn ears from falling off the gathering mechanism 122 and direct the corn ears to fall onto the body 150 of the bonnet 124 and slide along the surface of the body 150 toward the gathering channel 130 above the deck plates 134A and 134B so that the projections 136 of the gathering chain systems 132A and 132B grabs the corn ears and convey them along the gathering channel 130 toward the auger 112.

In some embodiments, the barrier flange 154 is formed around the forward end 158 of the body 150 of bonnet 124 and extends in the transverse direction with respect to the gathering direction G (or the longitudinal direction of the body 150).

In other embodiments, the barrier flange 154 includes a barrier surface 164. The barrier surface 164 operates to block harvested crops from dropping off the forward end of the bonnet 124. The barrier surface 164 faces in the gathering direction G so that it directs the corn ears in the gathering direction or backward direction G as the combine harvester 100 advances in the advance direction or the forward direction A. In some embodiments, the barrier surface 164 has a height (Df) between ¼ inches and 6 inches. In other embodiments, the height (Df) of the barrier surface 164 ranges from 1 inch to 4 inches.

In other embodiments, the barrier surface 164 is configured to be part of the blocking surface 146 of the barrier 128, along with the rear end surface 144 of the snout 126.

The kickback portion 156 of the bonnet 124 operates to change the direction of corn ears falling down after being separate from the stalks in order to further avoid loss of harvested crops out the forward end of the head assembly 104. The kickback portion 156 is configured to deflect the flow of the corn ears toward the gathering direction G and direct the harvested corn ears to fall into the effective region of the gathering channel 130 above the deck plates 134A and 134B (See the dashed lines in FIGS. 8 and 9). The effective region of the gathering channel 130 is referred to as an area of the gathering channel 130 where the gathering chain systems 132A and 132B can grab the harvested corn ears that have been separate from the stalks at the harvesting end of the gathering mechanism 122 and then deliver them to the auger 112 in the gathering direction G.

In some embodiments, the kickback portion 156 forms an angle A2 with respect to a vertical axis X2, which is transverse to the gathering direction G or to the ground GR (See FIGS. 8 and 9). The angle A2 is determined based on several factors, such as the speed of the combine harvester 100, the rotational speed of the gathering chain systems 132A and 132B, the volume or size of corn ears harvested from the stalks, and/or the dimensions of the components of the row unit divider assembly 106. In one embodiment, the angle A2 is greater than 0 degrees and less than 90 degrees. In other embodiments, the angle A2 is in a range from about 5 degrees to about 45 degrees.

The kickback portion 156 also has a height D2 from the longitudinal edge 160 of the bonnet 124. As the angle A2 of the kickback portion 156, the height D2 is also adjustable based on several factors as exampled above. The height D2 of the kickback portion 156 can be any number provided that it does not exceed the total height of the bonnet 124.

The kickback portion 156 includes a kickback surface 166 that substantially faces toward the collecting end of the gathering mechanism 122 at the angle A2 with respect to the vertical axis X2. The kickback surface 166 of the kickback portion 156 operates to deflect the corn ears falling down from the stalks at the harvesting end of the gathering mechanism 122 and thus cause them to slide along the kickback surface 166 and then to fall into the effective region of the gathering channel 130 above the deck plates 134A and 134B. In some embodiments, the kickback surface 166 has a height (Dk) between ¼ inches and 6 inches. In other embodiments, the height (Dk) of the kickback surface 166 ranges from 1 inch to 3 inches.

In some embodiments, the kickback portion 156 is arranged at the forward end 158 of the bonnet 124. The kickback portion 156 is formed adjacent the longitudinal edge 160 at the forward end 158 of the bonnet 124. In other embodiments, the kickback portion 156 can be arranged on any location of the surface of body 150. In still other embodiments, the kickback portion 156 is formed integrally with the barrier flange 154 of the bonnet 124. In some embodiments, the bonnet 124 can have a plurality of kickback portions thereon.

In other embodiments, the kickback surface 166 is configured to be part of the blocking surface 146 of the barrier 128, along with the rear end surface 144 of the snout 126 and the barrier surface 164 of the barrier flange 154.

Figure 11:
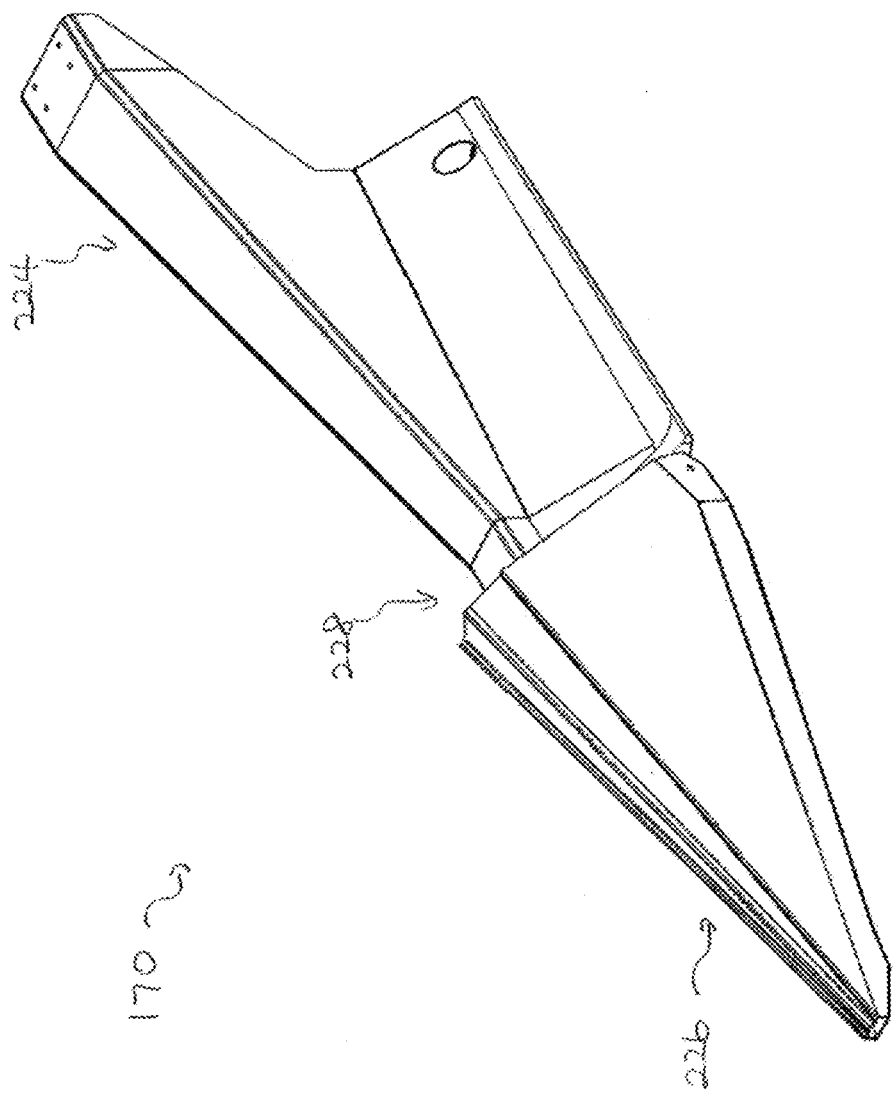
FIG. 11 is a front perspective view of an example fender assembly according to the present disclosure.

FIG. 11 is a front perspective view of an example fender assembly 170. In this example, the fender assembly 170 operates as a wall at each of the farthest side ends of the head assembly 104 (see FIG. 2) so that the harvested corn ears do not fall off the head assembly 104 as the combine harvester 100 advances in the forward direction. The fender assembly 170 also provides the same functions as a set of the bonnet 124, the snout 126 and the barrier 128.

The fender assembly 170 as shown in FIGS. 11-14 is configured to be installed at the left side end of the head assembly 104 when viewed from the forward end of the head assembly 104. Therefore, the right side of the fender assembly 170 in FIG. 11 faces a plurality of the row unit divider assemblies 106 of the head assembly 104. The left side of the fender assembly 170 in FIG. 11 indicates areas that the head assembly 104 does not cover for harvesting as the combine harvester 100 advances in the forward direction. In this regard, the right side of the fender assembly 170 illustrated in FIGS. 11-14 is also referred to as the inner surface of the fender assembly 170, and the left side of the fender assembly 170 is also named the outer surface of the fender assembly 170.

Figure 12:
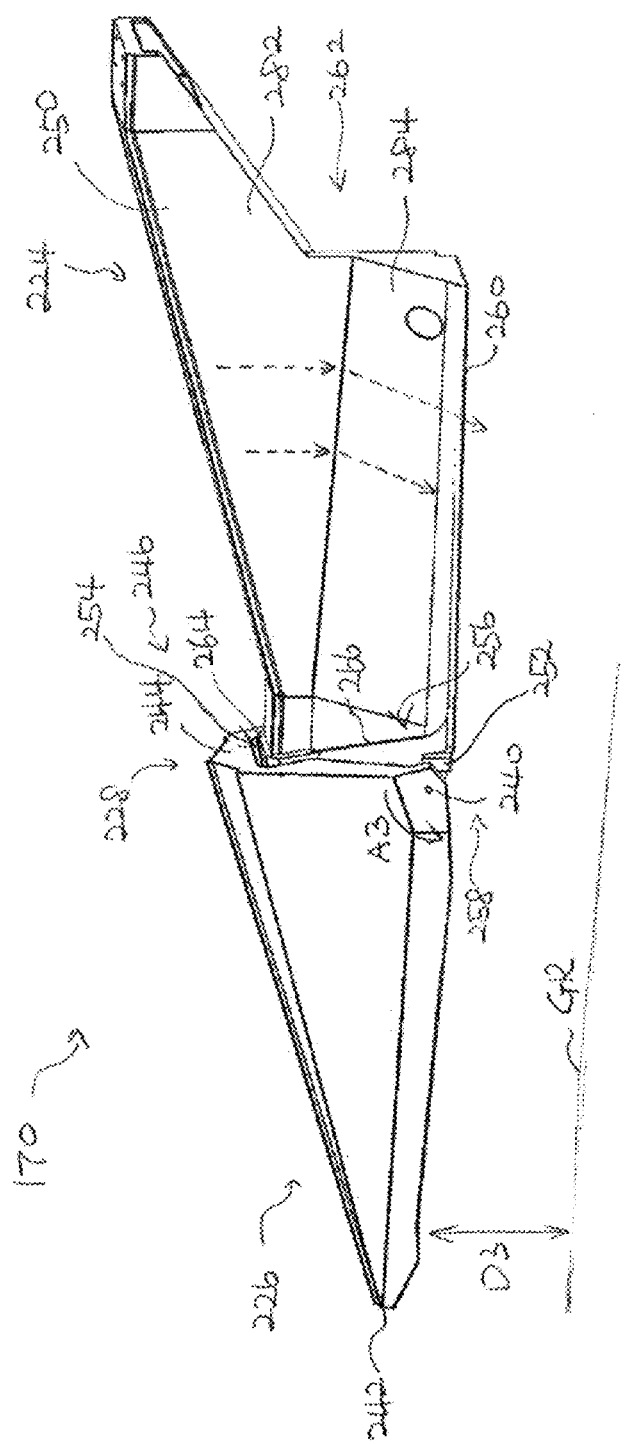
FIG. 12 is a rear perspective view of the fender assembly of FIG. 11.

FIGS. 12-14 are different views of the fender assembly 170 of FIG. 11. For example, FIG. 12 is a rear perspective view of the fender assembly 170 of FIG. 11. FIG. 13 is a side elevation view of the fender assembly 170 of FIG. 11. FIG. 14 is a top elevation view of the fender assembly 170 of FIG. 11. In this example, the fender assembly 170 includes a fender 224, a fender snout 226 and a fender barrier 228.

The fender 224 operates just as the bonnet 124. In some embodiments, the fender 224 causes the harvested corn ears to slide on the surface of the fender 224 and then gather onto the adjacent gathering channel 130 of the gathering mechanism 122. The corn ears that gather onto the gathering channel 130 are delivered by the adjacent gathering chain systems 132A and 132B into the auger 112. In other embodiments, the fender 224 is arranged to cover one of the pair of the gathering chain system 132A and 132B while the projections 136 extend over the fender 224 toward the adjacent gathering channel 130.

The fender snout 226 operates just as the snout 126. The details of the snout 126 explained above also apply to the fender snout 226. Just as the snout 126, the fender snout 226 is configured to slide into a space between adjacent rows of corn stalks as the combine harvester 100 advances in the forward direction. The fender snout 226 is configured to guide corn stalks into the gathering channel 130 of the gathering mechanism 122. The fender snout 226 has the same or similar shape as the snout 126. In some embodiments, the fender snout 226 has a forward end and a rearward end and is configured to have a smaller cross-section toward the forward end than toward the rearward end. For example, the fender snout 226 has a cone shape or a pyramid shape having multiple triangular sides.

In some embodiments, the fender snout 226 can have a shape unsymmetrical with respect to a longitudinal axis X4 (see FIG. 14) of the fender assembly 170 because the fender assembly 170 is installed at the side ends of the head assembly 104. For example, the fender assembly 170 illustrated in FIGS. 11-14 is configured to be installed in the left side end of the head assembly 104 when viewed from the forward end of the head assembly 104. Thus, the fender assembly 170 installed at the left side end of the head assembly 104 need not have the features of the snout 126 or the fender snout 226 as disclosed above on the left side of the fender assembly 170 because the left side of the fender assembly 170 is not used for harvesting of corn ears.

The fender snout 226 is connected to the forward end of the fender 224 at the rearward end of the fender snout 226. In some embodiments, the fender snout 226 is connected to the fender 224 at a snout pivot 240. The snout pivot 240 permits the fender snout 226 to pivot with respect to the fender 224 around the snout pivot 240, such as in the direction A3 or in the opposite direction. The snout pivot 240 permits the height (D3) of the fender snout 226 to be adjusted with respect to the ground GR, without adjusting the position of the fender 224. The snout pivot 240 also permits the fender snout 226 to pivot when the forward end of the fender snout 226 comes in contact with the ground GR or other objects such as rows of corn stalks, thereby reducing the chance of breaking the fender snout 226, the head assembly 104 or the row unit divider assembly 106. In other embodiments, the snout pivot 240 allows the row unit divider assembly 106 to be placed in a folded configuration (not shown) for more compact transportation and storage.

In some embodiments, the fender snout 226 has a tip portion 242 at the forward end of the fender snout 226. The tip portion 242 of the fender snout 226 provides a wear point that is stronger and more durable for longer life of the fender snout 226. The tip portion 242 also can provide a sharper tip of the forward end of the fender snout 226 so that the fender snout 226 slides along rows of corn stalks and picks up the corn stalks in more effective manners. In other embodiments, the tip portion 242 is replaceable so that it can be changed once sufficiently worn out (not shown)

In this example, the rearward end of the fender snout 226 has a rear end surface 244. The rear end surface 244 has a larger cross-section than the forward end of the fender 224. Therefore, when the fender snout 226 is connected to the fender 224, as shown in FIG. 12, the rearward end of the fender snout 226 overarches the forward end of the fender 224, thereby forming part of the fender barrier 228. In some embodiments, the rearward end of the fender snout 226 is configured to match up with the contour of the forward end of the fender 224.

In some embodiments, the fender snout 226 is formed of a sturdy material such as metal or plastic. In other embodiments, the fender snout 226 is formed of polyethylene, for example.

The fender barrier 228 operates just as the barrier 128 and has the same or similar configurations as the barrier 128. The fender barrier 228 operates to ensure the harvested corn ears to fall onto the gathering channel 130 between the gathering chain systems 132A and 132B above the deck plates 134A and 134B. The fender barrier 228 is configured to prevent the harvested corn ears from falling outside the head assembly 104 and falling off the forward end of the gathering mechanism 122. Instead, the fender barrier 228 operates to direct the corn ears to slide or fall in the gathering direction G so that they slide down along the inner surface of the fender 224 and fall onto on the adjacent gathering channel 130 above the deck plates 134A and 134B, and then are grabbed by the projections 136 between the gathering chain systems 132A and 132B and conveyed to the auger 112.

In this example, the fender barrier 228 is configured to form a blocking surface 246 facing in the gathering or backward direction G. The blocking surface 246 extends radially in a transverse direction with respect to the gathering direction G. The blocking surface 246 operates to keep the harvested corn ears slipping down to the gathering channel 130 above the deck plates 134A and 134B. In some embodiments, the blocking surface 246 includes the rear end surface 244 of the fender snout 226 and a barrier surface 264 of the fender 224.

In some embodiments, the fender barrier 228 is arranged adjacent the harvesting end of the gathering mechanism 122. In other embodiments, the fender barrier 228 is arranged next to a location behind the forward ends of the deck plates 134A and 134B in the gathering direction G. Such a location is preferably a location where corn ears are actually separated from corn stalks between the deck plates 134A and 134B. In still other embodiments, the fender barrier 228 is arranged at any location where corn ears would likely fall off the gathering mechanism 122 as the corn ears are separated from the stalks entering into the gathering channel 130 while the combine harvester 100 advances in the forward direction.

Referring again to FIGS. 12-14, the fender 224 includes a body 250, a pivot recess 252, a barrier flange 254 and a kickback portion 256. In some embodiments, the fender 224 is formed of a sturdy material such as metal or plastic. In other embodiments, the fender 224 is formed of polyethylene, for example.

The body 250 of the fender 224 is arranged on the gathering mechanism 122 in the gathering direction G so that the body 250 covers one of a pair of the gathering chain systems 132A and 132B while the body 150 is located next to the adjacent gathering channel 130 at the side end (in FIGS. 12-14, the left side end) of the head assembly 104.

In some embodiments, the body 250 of the fender 224 is an elongate structure having a forward end 258, a longitudinal edge 260 and a rearward end 262.

The forward end 258 of the body 250 is arranged at the harvesting end of the gathering mechanism 122 and is coupled to the rearward end of the fender snout 226.

The rearward end 262 of the body 250 is arranged at the collecting end of the gathering mechanism 122 and positioned adjacent the auger 112. In some embodiments, the rearward end 262 is pivotally connected at the collecting end of the gathering mechanism 122 so that the body 250 can be lifted up from the gathering mechanism 122 at the hinge for servicing of the gathering mechanism 122.

In some embodiments, the longitudinal edge 260 of the fender 224 is located next to the adjacent gathering channel 130 in parallel with the gathering channel 130 while the body 250 of the fender 224 covers one of the gathering chain systems 132A and 132B with the longitudinal edges 260 of the fender 224.

The body 250 of the fender 224 is configured to allow the harvested corn ears to fall on, and slide down along, the inner surface of the body 150 so that the corn ears fall into the gathering channel 130 above the deck plates 134A and 134B. In some embodiments, the body 250 includes a wall portion 282 and an angled portion 284.

The wall portion 282 of the body 250 has a tapered shape that is larger toward the rearward end 262 and smaller toward the forward end 258. Such a tapered shape of the wall portion 282 having a upward slope as a whole in the gathering direction G prevents the harvested corn ears from falling outside the head assembly 104 and increases the change of the corn ears falling inside the head assembly 104 and down to the adjacent gathering mechanism 122 and auger 112 at the collecting end.

The angled portion 284 of the body 250 operates to direct the harvested corn ears to fall onto the adjacent gathering channel 130 above the adjacent deck plates 134A and 134B. In some embodiments, the angled portion 284 is configured on the inner surface of the fender 224 and below the wall portion 282. In other embodiments, the angled portion 284 has a downward slope toward the adjacent gathering channel 130.

The pivot recess 252 is used to connect the fender 224 to the fender snout 226. In this example, the forward end 258 of the fender 224 is connected to the rearward end of the fender snout 226 at the pivot recess 252. The pivot recess 252 is matched up with, and coupled to, the snout pivot 240 of the fender snout 226. The coupling with the pivot recess 252 of the fender 224 and the snout pivot 240 of the fender snout 226 permits the fender snout 226 to pivot with respect to the fender 224 around the snout pivot 240 or the pivot recess 252.

The barrier flange 254 operates to prevent the harvested corn ears from falling off the gathering mechanism 122 and direct the corn ears to fall onto the body 250 of the fender 224 and slide along the inner surface of the body 250 toward the gathering channel 130 above the deck plates 134A and 134B so that the projections 136 of the gathering chain systems 132A and 132B grabs the corn ears and convey them along the gathering channel 130 toward the auger 112.

In some embodiments, the barrier flange 254 is formed around the forward end 258 of the body 250 of the fender 224 and extends in the transverse direction with respect to the gathering direction G (or the longitudinal direction of the body 250).

In other embodiments, the barrier flange 254 includes a barrier surface 264. The barrier surface 264 operates to block harvested crops from dropping off the forward end of the fender 224. The barrier surface 264 faces in the gathering direction G so that it directs the corn ears in the gathering direction or backward direction G as the combine harvester 100 advances in the advance direction or the forward direction A. In some embodiments, the barrier surface 264 has a height (Df) between ¼ inches and 6 inches (not shown). In other embodiments, the height (Df) of the barrier surface 264 ranges from 1 inch to 4 inches (not shown).

In other embodiments, the barrier surface 264 is configured to be part of the blocking surface 246 of the fender barrier 228, along with the rear end surface 244 of the fender snout 226.

The kickback portion 256 of the fender 224 operates to change the direction of corn ears falling down after being separate from the stalks in order to further avoid loss of harvested crops out the forward end of the head assembly 104. The kickback portion 256 is configured to deflect the flow of the corn ears toward the gathering direction G and direct the harvested corn ears to fall into the effective region of the adjacent gathering channel 130 above the deck plates 134A and 134B (See the dashed lines in FIGS. 13 and 14). The effective region of the gathering channel 130 is referred to as a location of the gathering channel 130 where the gathering chain systems 132A and 132B can grab the harvested corn ears that have been separate from the stalks at the harvesting end of the gathering mechanism 122 and then deliver them to the auger 112 in the gathering direction G.

In some embodiments, the kickback portion 256 forms an angle A4 with respect to a vertical axis X3, which is transverse to the gathering direction G (See FIG. 13). The angle A4 is determined based on several factors, such as the speed of the combine harvester 100, the rotational speed of the gathering chain systems 132A and 132B, the volume or size of corn ears harvested from the stalks, and/or the dimensions of the components of the row unit divider assembly 106. In one embodiment, the angle A4 is more than 0 degrees but less than 90 degrees. In other embodiments, the angle A4 is between 5 degrees and 45 degrees.

In other embodiments, the kickback portion 256 has an additional angled portion A5 with respect to the vertical axis X3. In one embodiment, the angle A5 is greater than 0 degrees and less than 90 degrees. In other embodiments, the angle A5 is in a range from about 5 degrees to about 45 degrees. In this example, the angled portion A5 is arranged below the angle A4 and formed continuously from the angle A4. In some embodiments the angle A5 is greater than the angle A4.

In still other embodiments, the kickback portion 256 can include other angled portions with respect to the vertical axis X3 and can be arranged anywhere on the inner surface of the body 250.

The kickback portion 256 also has a height D4 from the longitudinal edge 260 of the fender 224. As the angles A4 and A5 of the kickback portion 256, the height D4 is also adjustable based on several factors as exampled above. The height D4 of the kickback portion 256 can be any number provided that it does not exceed the total height of the fender 224.

The kickback portion 256 includes a kickback surface 266 that substantially faces toward the collecting end of the gathering mechanism 122 at the angles A4 and A5 with respect to the vertical axis X3. The kickback surface 266 of the kickback portion 256 operates to deflect the corn ears falling down from the stalks at the harvesting end of the gathering mechanism 122 and thus cause them to slide along the kickback surface 266 and then to fall into the effective region of the gathering channel 130 above the deck plates 134A and 134B. In some embodiments, the kickback surface 266 has a height (Dk) between ¼ inches and 6 inches (not shown). In other embodiments, the height (Dk) of the kickback surface 266 ranges from 1 inch to 3 inches (not shown).

In some embodiments, the kickback portion 256 is arranged at the forward end 258 of the fender 224. In other embodiments, the kickback portion 256 is formed adjacent the longitudinal edge 260 at the forward end 258 of the fender 224. In still other embodiments, the kickback portion 256 can be arranged on any location of the inner surface of body 250. In some embodiments, the kickback portion 256 is formed integrally with the barrier flange 254 of the fender 224.

In other embodiments, the kickback surface 266 is configured to be part of the blocking surface 246 of the fender barrier 228, along with the rear end surface 244 of the fender snout 226 and the barrier surface 264 of the barrier flange 254.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An apparatus for guiding harvested crops in a harvester head assembly of a combine harvester, wherein when in operation, the combine harvester and the harvester head assembly are driven in an advance direction, the apparatus comprising:
    a body including a top portion and a side portion and having a forward end and a rearward end, the forward end configured to connect to a snout; and
    a barrier flange extending from the forward end of the body in a direction transverse to the advance direction and along the side portion and at least a portion of the top portion, the barrier flange comprising:
        a barrier surface facing a direction opposite to the advance direction; and
        a kickback portion arranged adjacent to the barrier surface and at an angle to the barrier surface, the angle configured to deflect a flow of harvested crops in the direction opposite to the advance direction.

2. The apparatus of claim 1, wherein the apparatus is a bonnet of the harvester head assembly.

3. The apparatus of claim 1, wherein the apparatus is a fender of the harvester head assembly.

4. The apparatus of claim 1, wherein the kickback portion forms an angle toward the direction opposite to the advance direction with respect to an axis transverse to the ground.

5. The apparatus of claim 4, wherein the angle is greater than 0 degree and less than 90 degrees.

6. The apparatus of claim 1, wherein the barrier surface has a height between ¼ inches and 6 inches.

7. A harvester head assembly for a combine harvester, wherein when in operation, the combine harvester and the harvester head assembly are driven in an advance direction, the harvester head assembly having at least one row unit divider assembly, the row unit divider assembly comprising:

a bonnet comprising:
: a body including a top portion and a side portion and having a forward end and a rearward end; and
: a barrier flange extending from the forward end of the body in a direction transverse to the advance direction and along the side portion and at least a portion of the top portion, the barrier flange including:
:: a barrier surface facing a direction opposite to the advance direction; and
:: a kickback portion arranged adjacent the barrier surface and at an angle to the barrier surface, the angle configured to deflect a flow of harvested crops in the direction opposite to the advance direction;
a snout having a forward end and a rearward end, the rearward end of the snout connected to the forward end of the body of the bonnet; and
a barrier having a blocking surface, the blocking surface configured to direct a flow of harvested crops in a direction opposite to the advance direction.

8. The harvester head assembly of claim 7,
wherein the snout includes a rear end surface at the rearward end of the snout, the rear end surface facing opposite to the advance direction; and
wherein the blocking surface of the barrier is formed by the barrier surface of the bonnet and the rear end surface of the snout.

9. The harvester head assembly of claim 8, wherein the kickback portion of the barrier flange of the bonnet forms an angle toward the direction opposite to the advance direction with respect to an axis transverse to the ground.

10. The harvester head assembly of claim 9, wherein the angle is greater than 0 degrees and less than 90 degrees.

11. The harvester head assembly of claim 7, further comprising:
a fender assembly installed at side ends of the harvester head assembly, the fender assembly comprising:
: a fender comprising:
:: a body including a top portion and a side portion and having a forward end and a rearward end; and
:: a barrier flange extending from the forward end of the body of the fender in a direction transverse to the advance direction and along the side portion and at least a portion of the top portion of the body of the fender;
: a fender snout having a forward end and a rearward end, the rearward end of the fender snout connected to the forward end of the body of the fender; and
: a fender barrier having a blocking surface, the blocking surface configured to direct a flow of harvested crops in a direction opposite to the advance direction.

12. The harvester head assembly of claim 11,
wherein the barrier flange of the fender includes:
: a barrier surface facing a direction opposite to the advance direction; and
: a kickback portion arranged adjacent to the barrier surface and at an angle to the barrier surface, the angle configured to deflect a flow of harvested crops in the direction opposite to the advance direction;
wherein the fender snout includes a rear end surface at the rearward end of the snout, the rear end surface facing opposite to the advance direction; and
wherein the blocking surface of the fender barrier is formed by the barrier surface of the fender and the rear end surface of the snout.

13. The harvester head assembly of claim 11, wherein the kickback portion of the barrier flange of the fender forms an angle toward the direction opposite to the advance direction with respect to an axis transverse to the ground.

14. The harvester head assembly of claim 13, wherein the angle is in a range from 5 degrees to 45 degrees.

15. A combine harvester comprising:
a combine machine;
a feeder house arranged at a forward end of the combine harvester; and
a harvester head assembly connected to and extends from the forward end of the combine harvester, wherein when in operation, the combine harvester and the harvester head assembly are driven in an advance direction, the harvester head assembly having at least one row unit divider assembly, the row unit divider assembly comprising:
: a bonnet comprising:
:: a body including a top portion and a side portion and having a forward end and a rearward end; and
:: a barrier flange extending from the forward end of the body in a direction transverse to the advance direction and along the side portion and at least a portion of the top portion, the barrier flange including:
::: a barrier surface facing a direction opposite to the advance direction; and
::: a kickback portion arranged adjacent the barrier surface and at an angle to the barrier surface, the angle configured to deflect a flow of harvested crops in the direction opposite to the advance direction;
: a snout having a forward end and a rearward end, the rearward end of the snout connected to the forward end of the body of the bonnet; and
: a barrier having a blocking surface, the blocking surface configured to direct a flow of harvested crops in a direction opposite to the advance direction.

16. The combine harvester of claim 15,
wherein the snout includes a rear end surface at the rearward end of the snout, the rear end surface facing opposite to the advance direction; and
wherein the blocking surface of the barrier is formed by the barrier surface of the bonnet and the rear end surface of the snout.

17. The combine harvester of claim 16, wherein the kickback portion of the barrier flange of the bonnet forms an angle toward the direction opposite to the advance direction with respect to an axis transverse to the ground.

18. The combine harvester of claim 15, wherein the harvester head assembly further comprises:
a fender assembly installed at side ends of the harvester head assembly, the fender assembly comprising:
: a fender comprising:
:: a body having a forward end and a rearward end; and
:: a barrier flange extending from the forward end of the body of the fender;
: a fender snout having a forward end and a rearward end, the rearward end of the fender snout connected to the forward end of the body of the fender; and
: a fender barrier having a blocking surface, the blocking surface configured to direct a flow of harvested crops in a direction opposite to the advance direction.

19. The combine harvester of claim 18,
wherein the barrier flange of the fender includes:
: a barrier surface facing a direction opposite to the advance direction; and
: a kickback portion configured to deflect a flow of harvested crops in the direction opposite to the advance direction;

wherein the fender snout includes a rear end surface at the rearward end of the snout, the rear end surface facing opposite to the advance direction; and wherein the blocking surface of the fender barrier is formed by the barrier surface of the fender and the rear end surface of the snout.

20. The combine harvester of claim 19, wherein the kickback portion of the barrier flange of the fender forms an angle toward the direction opposite to the advance direction with respect to an axis transverse to the ground.

* * * * *